US008873231B2

(12) United States Patent
Ajmani et al.

(10) Patent No.: US 8,873,231 B2
(45) Date of Patent: Oct. 28, 2014

(54) ELECTRONIC DEVICE ENCLOSURE CONFIGURED TO SHIELD AGAINST ELECTROMAGNETIC INTERFERENCE

(75) Inventors: Ravinder Singh Ajmani, Fremont, CA (US); Ryan Thomas Davis, Mountain View, CA (US); Antony Nguyen, San Jose, CA (US); Albert John Wallash, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 965 days.

(21) Appl. No.: 12/978,239

(22) Filed: Dec. 23, 2010

(65) Prior Publication Data

US 2012/0162895 A1    Jun. 28, 2012

(51) Int. Cl.
*H05K 9/00*   (2006.01)
*G11B 33/14*  (2006.01)

(52) U.S. Cl.
CPC .................................. *G11B 33/1493* (2013.01)
USPC ...................................... 361/679.33; 361/818

(58) Field of Classification Search
CPC ...................................................... G06F 1/182
USPC ............................. 361/818, 679.33; 174/384
See application file for complete search history.

(56) References Cited

U.S. PATENT DOCUMENTS

| 4,926,291 | A | * | 5/1990 | Sarraf ........................ 361/679.36 |
| 5,021,905 | A | | 6/1991 | Sleger |
| 5,187,621 | A | | 2/1993 | Tacklind |
| 5,243,495 | A | | 9/1993 | Read et al. |
| 5,301,075 | A | | 4/1994 | Takemoto |
| 5,696,648 | A | | 12/1997 | Jeong et al. |
| 6,347,021 | B2 | * | 2/2002 | Kazmierczak et al. .... 360/97.21 |
| 6,377,448 | B1 | | 4/2002 | Liu et al. |
| 6,388,834 | B1 | | 5/2002 | Bernett et al. |
| 6,661,603 | B1 | | 12/2003 | Watkins et al. |
| 7,000,309 | B1 | | 2/2006 | Klassen et al. |
| 7,068,465 | B2 | | 6/2006 | Nguy |
| 7,218,473 | B2 | | 5/2007 | Bernett et al. |
| 7,525,758 | B2 | | 4/2009 | Abe |
| 7,605,999 | B1 | | 10/2009 | Kung et al. |
| 7,630,170 | B2 | | 12/2009 | Hayakawa et al. |
| 7,701,663 | B2 | | 4/2010 | Oh et al. |
| 7,995,355 | B2 | | 8/2011 | Cochrane |
| 2008/0158851 | A1 | * | 7/2008 | Cochrane ...................... 361/818 |

* cited by examiner

*Primary Examiner* — Ramon Barrera

(57) ABSTRACT

An electronic device enclosure configured to shield against electromagnetic interference (EMI). The electronic device enclosure includes an electronic device-enclosure base and at least one laterally disposed blunt boss. The electronic device-enclosure base includes a bottom, and sides and attached to the bottom in a boxlike configuration. The laterally disposed blunt boss is configured so as to be disposed between, and to couple electrically, a side of the electronic device-enclosure base and a vertical flange of an electronic device-enclosure cover. The electronic device-enclosure base and the electronic device-enclosure cover are configurable with respect to said laterally disposed blunt boss to shield an interior space enclosed by the electronic device-enclosure base and the electronic device-enclosure cover against EMI at a resonant frequency of a slot of the electronic device enclosure. A hard-disk drive including a disk enclosure configured to shield against EMI and a method for assembling the hard-disk drive are also provided.

25 Claims, 7 Drawing Sheets

600A

- 610 POSITION A DISK-ENCLOSURE BASE OF THE HARD-DISK DRIVE TO RECEIVE A DISK-ENCLOSURE COVER
- 620 PLACE THE DISK-ENCLOSURE COVER ON TOP OF THE DISK-ENCLOSURE BASE SUCH THAT VERTICAL FLANGES OF THE DISK-ENCLOSURE COVER LIE OUTSIDE OF SIDES OF THE DISK-ENCLOSURE BASE
- 630 PUSH ON A VERTICAL FLANGE OF THE DISK-ENCLOSURE COVER IN A DIRECTION ABOUT PERPENDICULAR TO A SIDE OF THE DISK-ENCLOSURE BASE, IN A MANNER THAT SUPPRESSES GENERATION OF PARTICULATE DEBRIS, SUCH THAT THE VERTICAL FLANGE OF THE DISK-ENCLOSURE COVER IS ELECTRICALLY COUPLED WITH THE LATERALLY DISPOSED BLUNT BOSS AND THE DISK-ENCLOSURE COVER AND THE DISK-ENCLOSURE BASE ARE CONFIGURED TO SHIELD AN INTERIOR SPACE ENCLOSED BY A DISK ENCLOSURE AGAINST ELECTROMAGNETIC INTERFERENCE
- 640 FASTEN THE DISK-ENCLOSURE COVER TO THE DISK-ENCLOSURE BASE

635 PUSH ON A SECOND VERTICAL FLANGE OF THE DISK-ENCLOSURE COVER IN A DIRECTION ABOUT PERPENDICULAR TO A SECOND SIDE OF THE DISK-ENCLOSURE BASE, IN A MANNER THAT SUPPRESSES GENERATION OF PARTICULATE DEBRIS, SUCH THAT THE SECOND VERTICAL FLANGE OF THE DISK-ENCLOSURE COVER IS ELECTRICALLY COUPLED WITH THE LATERALLY DISPOSED BLUNT BOSS AND THE DISK-ENCLOSURE COVER AND THE DISK-ENCLOSURE BASE ARE CONFIGURED TO SHIELD AN INTERIOR SPACE ENCLOSED BY A DISK ENCLOSURE AGAINST ELECTROMAGNETIC INTERFERENCE

FIG. 6B

ELECTRONIC DEVICE ENCLOSURE CONFIGURED TO SHIELD AGAINST ELECTROMAGNETIC INTERFERENCE

TECHNICAL FIELD

Embodiments of the present invention relate generally to electronic device enclosures, and in particular to disk enclosures of hard-disk drives (HDDs).

BACKGROUND

With the advance of HDD technology, the magnetic fields read by a magnetic-recording head from the recording surface of a magnetic-recording disk have become progressively smaller. Consequently, stray electromagnetic fields of low intensity have become of greater concern. For example, stray electromagnetic fields, as low as 3 volts/meter (V/m), can interfere with the read operation of the magnetic-recording head, and give rise to errors in the retrieval of information stored on the magnetic-recording disk. Thus, engineers and scientists engaged in the development of HDDs are interested in providing an HDD environment of high reliability for the retrieval of information, and HDD designs that can achieve such high reliability without excessive cost.

SUMMARY

Certain embodiments of the present invention include an electronic device enclosure configured to shield against electromagnetic interference (EMI). The electronic device enclosure includes an electronic device-enclosure base and at least one laterally disposed blunt boss. The electronic device-enclosure base includes a bottom, and sides attached to the bottom in a boxlike configuration. The laterally disposed blunt boss is configured so as to be disposed between, and to couple electrically, a side of the electronic device-enclosure base and a vertical flange of an electronic device-enclosure cover. The electronic device-enclosure base and the electronic device-enclosure cover are configurable with respect to the laterally disposed blunt boss to shield an interior space enclosed by the electronic device-enclosure base and the electronic device-enclosure cover against EMI at a resonant frequency of a slot of the electronic device enclosure. Other embodiments of the present invention include a hard-disk drive (HDD) including a disk enclosure configured to shield against EMI and a method for assembling the HDD.

DESCRIPTION OF THE DRAWINGS

The accompanying drawings, which are incorporated in and form a part of this specification, illustrate embodiments of the invention and, together with the description, serve to explain the embodiments of the invention:

FIG. 6A is a flowchart of a method for assembling the HDD including the disk enclosure configured to shield against EMI, in accordance with one or more embodiments of the present invention.

FIG. 6B is a continued flowchart of the method for assembling the HDD including the disk enclosure configured to shield against EMI, in accordance with one or more embodiments of the present invention.

Figure 1:
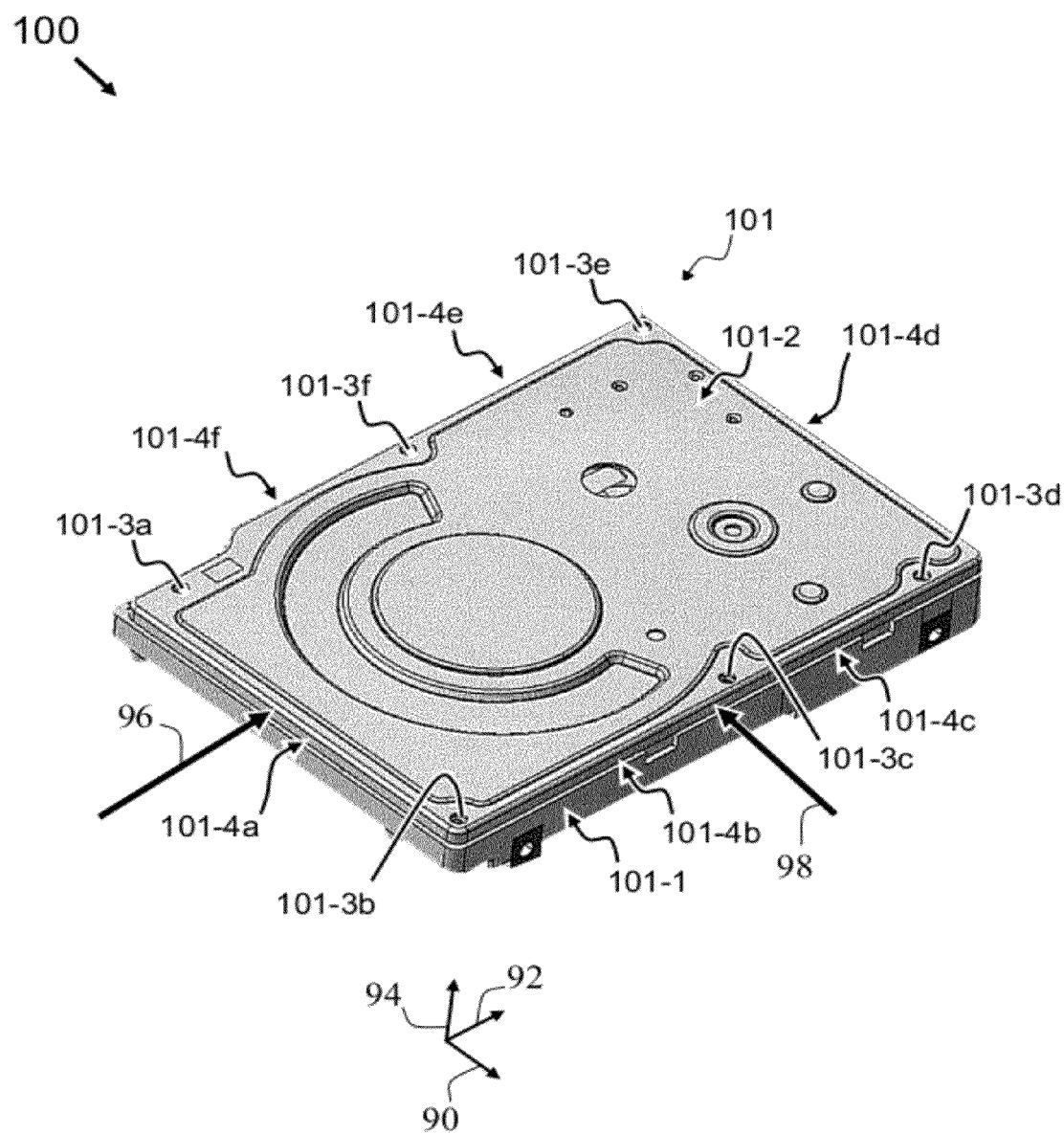
FIG. 1 is a perspective view of an example electronic device enclosure, which is a disk enclosure for a hard-disk drive (HDD), configured to shield against electromagnetic interference (EMI), in accordance with one or more embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be appreciated that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Physical Description of Embodiments of an Electronic Device Enclosure Configured to Shield Against Electromagnetic Interference (EMI)

Figure 5:
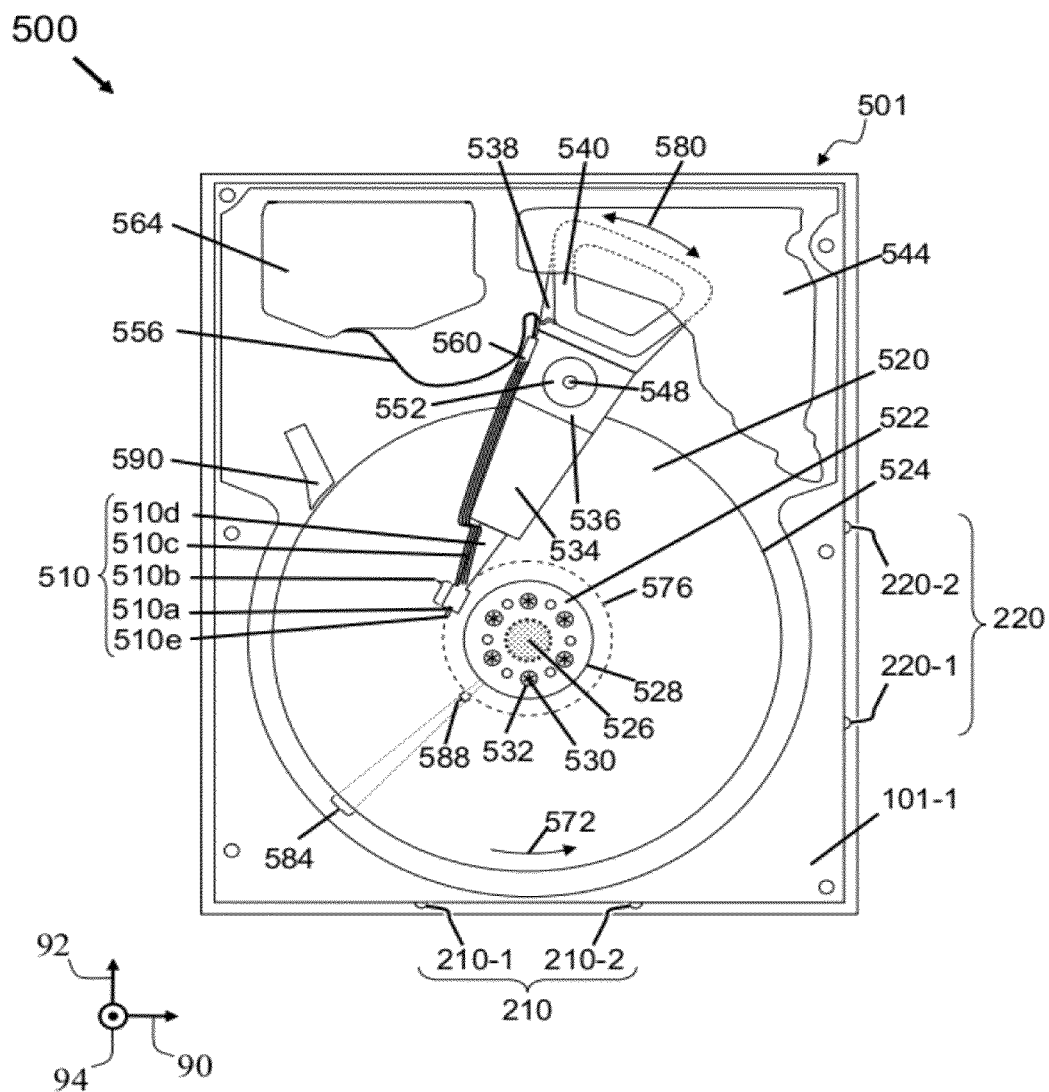
FIG. 5 is a perspective view of an example electronic device with the electronic device-enclosure cover removed, which is a HDD with the disk-enclosure cover of the disk enclosure of FIG. 1 removed, in accordance with one or more embodiments of the present invention.

With reference now to FIG. 1, in accordance with one or more embodiments of the present invention, a perspective view 100 is shown of an example electronic device enclosure, which is a disk enclosure 101 for a hard-disk drive (HDD) 501 (see FIG. 5). The electronic device enclosure is configured to shield against electromagnetic interference (EMI). The disk enclosure 101 includes a disk-enclosure base 101-1 and a disk-enclosure cover 101-2. The disk enclosure 101 includes a plurality of screw holes 101-3a, 101-3b, 101-3c, 101-3d, 101-3e and 101-3f. Screws (not shown) are used to fasten the disk-enclosure cover 101-2 to the disk-enclosure base 101-1. These screws also provide electrical contacts between the disk-enclosure cover 101-2 and the disk-enclosure base 101-1 at the location of the screws. Between the locations of the screws are regions where no screw provides electrical contact between the disk-enclosure cover 101-2 and the disk-enclosure base 101-1; such an inter-screw region between two adjacent screws is referred to by the term of art, "slot." For example, slot 101-4a corresponds to the inter-screw region between the adjacent screw holes 101-3a and 101-3b; and similarly, slot 101-4b corresponds to the inter-screw region between the adjacent screw holes 101-3b and 101-3c; slot 101-4c corresponds to the inter-screw region between the adjacent screw holes 101-3c and 101-3d; slot 101-4d corresponds to the inter-screw region between the adjacent screw holes 101-3d and 101-3e; slot 101-4e corresponds to the inter-screw region between the adjacent screw holes 101-3e and 101-3f; and, slot 101-4f corresponds to the inter-screw region between the adjacent screw holes 101-3f and 101-3a. In the absence of means for providing electrical coupling between the disk-enclosure cover 101-2 and the disk-enclosure base 101-1 within the region spanned by a slot, the slot provides a resonant structure that is tuned for the admission of electromagnetic radiation, for example, radio waves, having a wavelength, $\lambda$, that is equal to about four times the distance between the two adjacent screws. Thus, a disk enclosure without means for electrically coupling a disk-enclosure cover and a disk-enclosure base within a slot acts as a leaky Faraday cage for admission of EMI, for example, radio frequency interference (RFI), with a resonant frequency determined by the length of a slot, which is the distance between two adjacent screws. When the level of the fields associated with this electromagnetic radiation exceeds a level of about 3 volts per meter (V/m) inside the disk enclosure 101 of the HDD 501, the read operation of a magnetic-recording head that reads data from a magnetic-recording disk may be interfered with causing errors in the read-back signal from the magnetic-recording head. Embodiments of the present invention shield an interior space enclosed by the electronic device-enclosure base, for example, the disk-enclosure base 101-1, and the electronic device-enclosure cover, for example, the disk-enclosure cover 101-2, against EMI at a resonant frequency of a slot, for example, slot 101-4a, of the electronic device enclosure, for example, disk enclosure 101.

As subsequently described herein, embodiments of the present invention for the electronic device enclosure, the electronic device-enclosure base and the electronic device-enclosure cover are, respectively, presented: for the disk enclosure 101, which is one example of an electronic device enclosure; for the disk-enclosure base 101-1, which is one example of an electronic device-enclosure base; and, for the disk-enclosure cover 101-2, which is one example of an electronic device-enclosure cover. Thus, in accordance with embodiments of the present invention, the electronic device-enclosure base includes the disk-enclosure base 101-1 of the HDD 501 (see FIG. 5); electronic device-enclosure cover includes the disk-enclosure cover 101-2 of the HDD 501; and the electronic device enclosure includes the disk enclosure 101 of the HDD 501.

With further reference to FIG. 1, in accordance with one or more embodiments of the present invention, a triad of arrows 90, 92 and 94 is used to indicate the relative orientation of components in disk enclosure 101; the direction of arrow 92 is about parallel to the long side of the disk-enclosure base 101-1 of disk enclosure 101; the direction of arrow 90 is perpendicular to arrow 92 and is about parallel to the short side of the disk-enclosure base 101-1 of disk enclosure 101; and, arrow 94 is about perpendicular to the plane of the disk-enclosure base 101-1, as well as the plane of the recording surface of the magnetic-recording disk 420 (not shown but, see FIG. 5), and therefore is perpendicular to arrows 90 and 92. Thus, the triad of arrows 90, 92 and 94 are related to one another by the right-hand rule for vectors in the direction of the arrows 90, 92 and 94 such that the cross product of the vector corresponding to arrow 90 and the vector corresponding to arrow 92 produces a vector parallel and oriented in the direction of the arrow 94. The triad of arrows 90, 92 and 94 is subsequently used to indicate the orientation of views for subsequently described drawings of the disk enclosure 101. The terms of art, "top," and "bottom," refer to components the principal surfaces of which are disposed about normal to the arrow 94. The term of art, "vertical," refers to a side or a flange that lies about parallel to the arrow 94. The term of art, "lateral," refers to a side that is about normal to either of the arrows 90 and 92; and, the term of art, "laterally disposed," refers to a component that is disposed on a side or a flange that lies about normal to either of the arrows 90 and 92. The term of art, "front," refers to a side that is about normal to the arrow 92 at the left side of FIG. 1; for example, arrow 96, which is next described in greater detail, points to the front side of the HDD 501 (see FIG. 5).

With further reference to FIG. 1, in accordance with embodiments of the present invention, arrow 96 and arrow 98 are shown. In one embodiment of the present invention, arrow 96 is about perpendicular to a side of the disk-enclosure base 101-1. Arrow 96 denotes a direction in which a vertical flange of the disk-enclosure cover 101-2 is pushed in order to engage a laterally disposed blunt boss that provides electrical coupling between the disk-enclosure cover 101-2 in the disk-enclosure base 101-1 along the side of the disk enclosure 101 proximate to the magnetic-recording disk. Similarly, arrow 98 denotes a direction in which a second vertical flange of the disk-enclosure cover 101-2 is pushed in order to engage another laterally disposed blunt boss that provides electrical coupling between the disk-enclosure cover 101-2 in the disk-enclosure base 101-1 along a second side of the disk enclosure 101 proximate to the magnetic-recording disk. In accordance with embodiments of the present invention, the disk enclosure 101 is assembled by pushing on vertical flanges of the disk-enclosure cover 101-2 in one or the other, or successively both of, the directions indicated by the arrows 96 and 98 so that the disk-enclosure base 101-1 and the disk-enclosure cover 101-2 are electrically coupled to a laterally disposed blunt boss in a manner that suppresses the generation of particulate debris, which is subsequently described in greater detail. Thus, in accordance with embodiments of the present invention, the disk enclosure 101 of HDD 501 (see FIG. 5) may be assembled in a clean manner that suppresses the generation of particulate debris and get provides for the electrical shielding of electronic components, namely a magnetic-recording head and a magnetic-recording disk of HDD 501, which to the inventors knowledge and belief distinguishes embodiments of the present invention from other methods of assembly known in the art. Indeed, this method of assembly and the arrangement of the shielding features, viz., the laterally disposed blunt bosses, the inventors believe may even find utility in the assembly and shielding of electronic device enclosures for electronic devices, more generally. The disposition of the sides of the disk-enclosure base 101-1 and the vertical flanges of the disk-enclosure cover 101-2 relative to one or more laterally disposed blunt bosses that provide electrical coupling between the disk-enclosure base 101-1 in the disk-enclosure cover 101-2 are next described with the aid of FIGS. 2 and 3, and FIG. 4, respectively.

Figure 2:
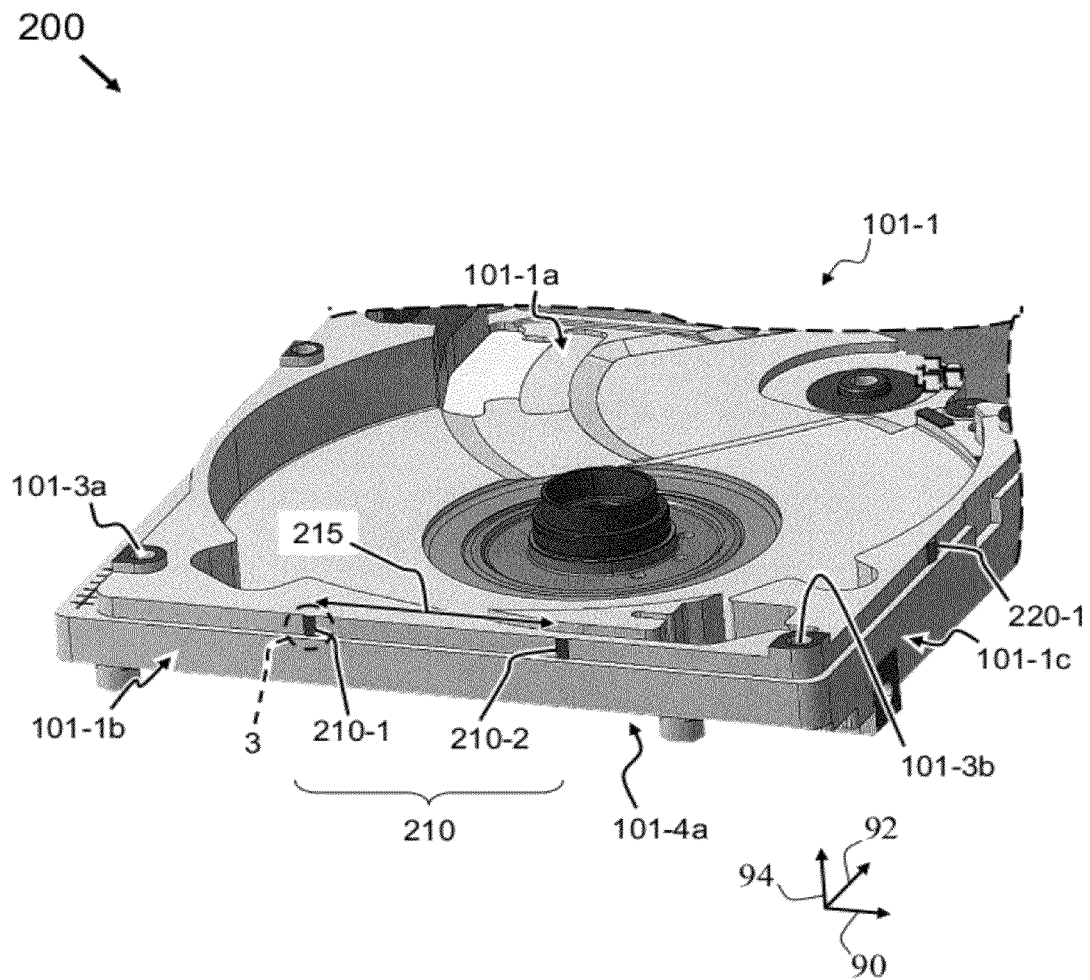
FIG. 2 is a cut-away perspective view of a portion of an example electronic device-enclosure base, which is a disk-enclosure base of the disk enclosure of FIG. 1, in accordance with one or more embodiments of the present invention.

With reference now to FIG. 2, in accordance with one or more embodiments of the present invention, a cut-away perspective view 200 is shown of a portion of an example electronic device-enclosure base, which is a disk-enclosure base 101-1 of the disk enclosure 101 of FIG. 1. The triad of arrows 90, 92 and 94 indicates the orientation of the perspective view 200 shown in FIG. 2 relative to the perspective view 100 shown in FIG. 1. The disk enclosure 101 includes a disk-enclosure base 101-1 and at least one laterally disposed blunt boss 210-1. The disk-enclosure base 101-1 includes a bottom 101-1a, and sides, of which sides 101-1b and 101-1c are examples, attached to the bottom 101-1a in a boxlike configuration. At least one laterally disposed blunt boss, for example, one of a plurality 210 of blunt bosses 210-1 and 210-2, is disposed in proximity to a top portion of the side 101-1b of the disk-enclosure base 101-1 and extends laterally outwards from the side 101-1b. As shown in FIG. 2, enclosed in circle three is blunt boss 210-1, which is described in greater detail in FIG. 3. The disk-enclosure base 101-1 further includes a second side 101-1c. The second side 101-1c may also include at least one laterally disposed blunt boss 220-1 disposed in proximity to a top portion of the second side 101-1c of the disk-enclosure base 101-1. The second side 101-1c is configured to couple electrically with the disk-enclosure cover 101-2. The side 101-1b and the second side 101-1c are adjacent sides of the disk-enclosure base 101-1. The side 101-1b and the second side 101-1c may be about orthogonally disposed to one another. The laterally disposed blunt boss 210-1 is configured so as to be disposed between a side 101-1b of the disk-enclosure base 101-1 and a vertical flange 101-2b (see FIG. 4) of the disk-enclosure cover 101-2; and, the laterally disposed blunt boss 210-1 is also configured to couple electrically a side 101-1b of the disk-enclosure base 101-1 with a vertical flange 101-2b (see FIG. 4) of the disk-enclosure cover 101-2. Also, with further reference to FIG. 1, the disk-enclosure base 101-1 and the disk-enclosure cover 101-2 are configurable with respect to the laterally disposed blunt boss 210-1 to shield an interior space enclosed by the disk-enclosure base 101-1 and the disk-enclosure cover 101-2 against EMI at a resonant frequency of a slot 101-4a of the disk enclosure 101.

Figure 3:
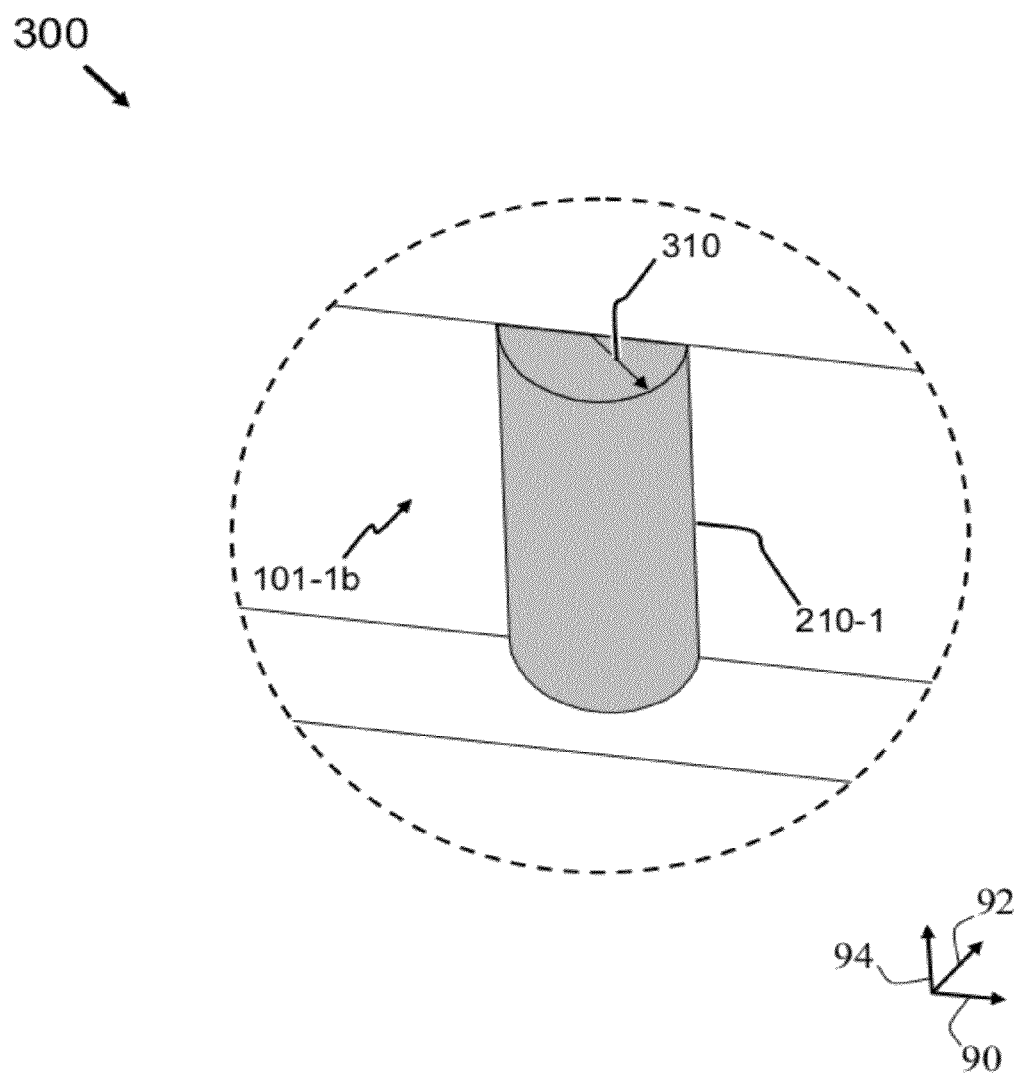
FIG. 3 is a perspective view detailing an example laterally disposed blunt boss within circle 3 of the electronic device-enclosure base of FIG. 2, in accordance with one or more one embodiment of the present invention.

With reference now to FIG. 3, in accordance with one or more embodiments of the present invention, a perspective view 300 is shown of the laterally disposed blunt boss 210-1. FIG. 3 illustrates in detail the shape of the laterally disposed blunt boss 210-1 within circle 3 of the disk-enclosure base 101-1 of FIG. 2. The triad of arrows 90, 92 and 94 indicates the orientation of the perspective view 300 shown in FIG. 3 relative to the perspective views 100 and 200 shown in FIGS. 1 and 2. In one embodiment of the present invention, the laterally disposed blunt boss 210-1 may have, by way of example, the shape of a semi-cylindrical body, without limitation thereto. The cylinder corresponding to blunt boss 210-1 has a radius 310; however, a blunt boss that is the cylinder of a circular segment, as well as other generalized cylinders, are also within the spirit and scope of embodiments of the present invention. For embodiments of the present invention based on cylinders of a circle or a circular segment, the radius may be increased to increase capacitive coupling between the disk-enclosure base 101-1 and the disk-enclosure cover 101-2. As shown in FIG. 3, the blunt boss 210-1 is disposed laterally at the top of the side 101-1b; and, the outer surface of the top of the side 101-1b is recessed back from the outer surface of the lower portion of the side 101-1b by a machined offset. The offset, as well as the blunt boss, may be produced when machining the disk-enclosure base 101-1 from a casting from which to disk-enclosure base 101-1 is fabricated. The offset may be machined such that vertical flanges of the disk-enclosure cover 101-2 overlap the lower portion of the side 101-1b, which is next described.

Figure 4:
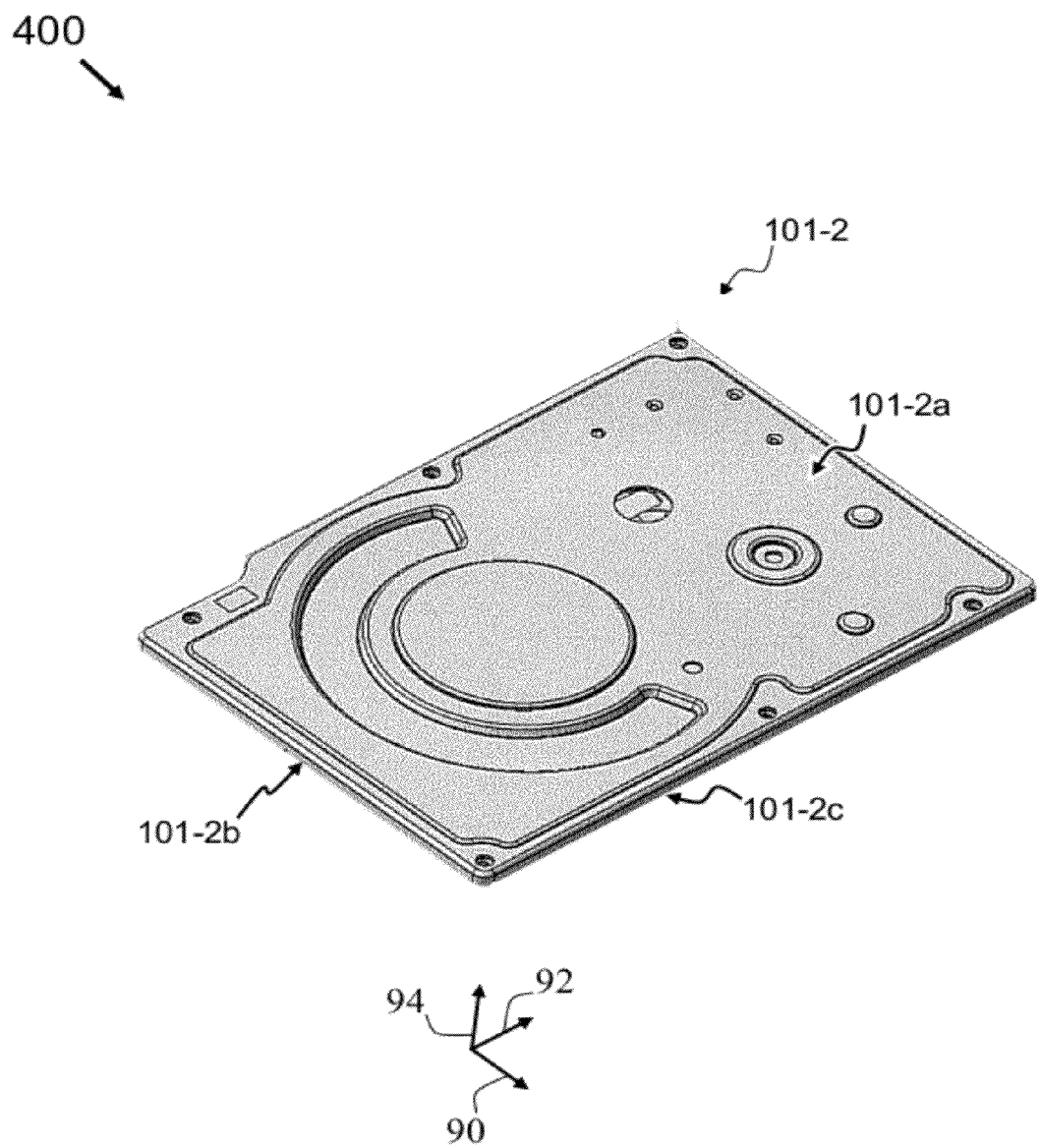
FIG. 4 is a perspective view of an example electronic device-enclosure cover, which is a disk-enclosure cover of the disk enclosure of FIG. 1, in accordance with one or more another embodiment of the present invention.

With reference now to FIG. 4 and further reference to FIGS. 1-3, in accordance with one or more embodiments of the present invention, a perspective view 400 is shown of an example electronic device-enclosure cover, which is a disk-enclosure cover 101-2 of the disk enclosure 101 of FIG. 1. The triad of arrows 90, 92 and 94 indicates the orientation of the perspective view 400 shown in FIG. 4 relative to the perspective view 100 shown in FIG. 1. The disk enclosure 101 also includes the disk-enclosure cover 101-2 shown in FIG. 4. The disk-enclosure cover 101-2 includes a top 101-2a, and vertical flanges, of which vertical flanges 101-2b and 101-2c are examples. The vertical flanges are attached to the top 101-2a in a boxlike configuration. At least one vertical flange 101-2b of the disk-enclosure cover 101-2 is configured to couple electrically with the blunt boss 210-1 of the disk enclosure 101. In accordance with embodiments of the present invention, the disk enclosure 101, the blunt boss 210-1 and the disk-enclosure cover 101-2 are configured to shield an interior space enclosed by the disk-enclosure base 101-1 and the disk-enclosure cover 101-2 against EMI. The vertical flange 101-2b of the disk-enclosure cover 101-2 is disposed about orthogonally to the top 101-2a of the disk-enclosure cover 101-2. In an alternative embodiment of the present invention, at least one laterally disposed blunt boss (not shown) may be disposed on the vertical flange 101-2b such that the laterally disposed blunt boss extends laterally inwards from the inside of the vertical flange 101-2b. In one embodiment of the present invention, the blunt bosses 210-1 and 210-2 are spaced to shield an interior space enclosed by the disk-enclosure base 101-1 and the disk-enclosure cover 101-2 against EMI with a frequency of about less than 3 gigahertz (GHz). The blunt bosses 210-1 and 210-2 are spaced to shield an interior space enclosed by the disk-enclosure base 101-1 and the disk-enclosure cover 101-2 against EMI at a frequency of less than about 1.8 GHz by reducing an electric field component of an electromagnetic field associated with the EMI within the interior space to less than about 10 V/m. Also, with further reference to FIG. 2, a spacing 215 and location of the blunt bosses 210-1 in 210-2 are selected to shift the resonance of electromagnetic radiation penetrating the sides of the disk enclosure 101 to a higher frequency so that the electromagnetic field intensity at a frequency of 1.8 GHz is less than 3 V/m. Thus, in accordance with embodiments of the present invention, the provision of blunt bosses that serve to electrically couple the disk-enclosure cover with the disk-enclosure base creates a Faraday cage with additional shorting structures between the disk-enclosure cover 101-2 in the disk-enclosure base 101-1 beyond the screws provided to fasten the disk-enclosure cover 101-2 to the disk-enclosure base 101-1 so that the electromagnetic field intensity at the frequency of a slot resonance is suppressed, for example, the slot resonance associated with slot 101-4a.

With further reference to FIGS. 3 and 4, in accordance with one or more embodiments of the present invention, in order to provide the shielding effect associated with the shorting of the disk-enclosure cover 101-2 to the disk-enclosure base 101-1, the vertical flange 101-2b of the disk-enclosure cover 101-2 may be ohmically coupled with low impedance to the laterally disposed blunt boss 210-1. In an alternative embodiment of the present invention, as a capacitive coupling may provide an alternating current (AC) short-circuit for frequencies associated with a slot resonance, the vertical flange 101-2b of the disk-enclosure cover 101-2 may, thus, be capacitively coupled with low impedance to the laterally disposed blunt boss 210-1. For this latter embodiment of the present invention, ohmic contact between the blunt boss and one or the other of a vertical flange of the disk-enclosure cover 101-2 and a top of the side of the disk-enclosure base 101-1 may not be present; and, the capacitive impedance of the electrical coupling between the disk-enclosure cover 101-2 and the disk-enclosure base 101-1 can be increased by providing a large surface area of interaction between the blunt boss and the surface with which it electrically couples, for example, one or the other of a vertical flange of the disk-enclosure cover 101-2 and a top of the side of the disk-enclosure base 101-1. Thus, as previously described in the discussion of FIG. 3, a blunt boss with a semi-cylindrical shape having a large radius of curvature, for example, radius 310, can provide increased surface area for electrical coupling through the blunt boss providing lowered capacitive impedance at frequencies associated with a slot resonance.

With further reference to FIGS. 1-4, in accordance with one or more embodiments of the present invention, the disk-enclosure cover 101-2 may be coupled electrically with the disk-enclosure base 101-1 in a direction about normal to a plane different than a plane of the top 101-2a of the disk-enclosure cover 101-2. The blunt boss 210-1, the vertical flange 101-2b and the disk-enclosure cover 101-2 may also be configured to suppress production of strain in the disk-enclosure cover 101-2, upon assembling the disk-enclosure cover 101-2 with the disk-enclosure base 101-1, because the vertical flange of the disk-enclosure cover 101-2 is configured for gently pushing on and sliding the disk-enclosure cover 101-2 until the blunt boss 210-1 electrically couples the disk-enclosure cover 101-2 with the disk-enclosure base 101-1. The blunt boss 210-1, the vertical flange 101-2b and the disk-enclosure cover 101-2 are also configured to suppress generation of particulate debris, upon assembling the disk-enclosure cover 101-2 with the disk-enclosure base 101-1, because a vertical flange of the disk-enclosure cover 101-2 is configured for gently pushing on and sliding the disk-enclosure cover 101-2 until the blunt boss 210-1 electrically couples the disk-enclosure cover 101-2 with the disk-enclosure base 101-1. Moreover, the rounded shape of a blunt boss, for example, the blunt boss 210-1 shown in FIG. 3, precludes the generation of particulate debris that may result from rubbing and abrasion at the edges of bosses having sharp corners upon assembly and subsequent thermal cycling in operation of the HDD 501. In addition, in accordance with embodiments of the present invention, calculations indicate that the spacing between the disk-enclosure cover 101-2 and the disk-enclosure base 101-1 where blunt boss is disposed having a large radius of curvature so that the blunt boss extends across the entire front side of the disk enclosure 101, identified with the side 101-1b of the disk-enclosure base 101-1 in the vertical flange 101-2b of the disk-enclosure cover 101-2, is on the order of 0.0012 millimeters (mm), after a full thermal cycle from −30° C. to 70° C., for a disk-enclosure base 101-1 composed of a steel casting and a disk-enclosure cover 101-2 composed of an aluminum alloy. The spacing is more than adequate to still provide good capacitive coupling between the disk-enclosure cover 101-2 in the disk-enclosure base 101-1, after thermal cycling.

With reference now to FIG. 5, in accordance with one or more embodiments of the present invention, a plan view 500 is shown of an example electronic device with the electronic device-enclosure cover removed, viz., HDD 501 with the disk-enclosure cover 101-2 of the disk enclosure 101 of FIG. 1 removed. The triad of arrows 90, 92 and 94 indicates the orientation of the plan view 500 shown in FIG. 5 relative to the perspective view 100 shown in FIG. 1. FIG. 5 illustrates the arrangement of components of HDD 501 including the disk enclosure 101, which is one example of the electronic device enclosure previously described. In the subsequent description of HDD 501 and disk enclosure 101, embodiments of the present invention incorporate within the environment of HDD 501, without limitation, the previously described embodiments of the present invention for the disk enclosure 101. Moreover, HDD 501 is but one representative environment for embodiments of the present invention, as embodiments of the present invention also encompass within their spirit and scope electronic device enclosures for other electronic devices, more generally.

With further reference to FIG. 5, in accordance with one or more embodiments of the present invention, HDD 501 includes at least one head-gimbal assembly (HGA) 510 including a magnetic-recording head 510a, a lead-suspension 510c attached to the magnetic-recording head 510a, and a load beam 510d attached to a slider 510b, which includes the magnetic-recording head 510a at a distal end of the slider 510b; the slider 510b is attached at the distal end of the load beam 510d to a gimbal portion of the load beam 510d. HDD 501 also includes at least one magnetic-recording disk 520 rotatably mounted on a spindle 526 and a drive motor (not shown) mounted in a disk-enclosure base 101-1 and attached to the spindle 526 for rotating the magnetic-recording disk 520. The magnetic-recording head 510a that includes a write element, a so-called writer, and a read element, a so-called reader, is disposed for respectively writing and reading information, referred to by the term of art, "data," stored on the magnetic-recording disk 520 of HDD 501. The magnetic-recording disk 520, or a plurality (not shown) of magnetic-recording disks, may be affixed to the spindle 526 with a disk clamp 522. The disk clamp 522 includes a circular plate; and, the circular plate includes a plurality of fastener holes, of which fastener hole 530 is an example. The plurality of fastener holes, of which fastener hole 530 is an example, is configured to accept a plurality of fasteners, of which fastener 532 (indicated by the hex-shaped "star" representative of a Torx™ screw) is an example, such that the fasteners are configured to fasten the disk clamp 522 to couple the magnetic-recording disk 520 with the spindle 526. HDD 501 further includes an arm 534 attached to HGA 510, a carriage 536, a voice-coil motor (VCM) that includes an armature 538 including a voice coil 540 attached to the carriage 536; and a stator 544 including a voice-coil magnet (not shown); the armature 538 of the VCM is attached to the carriage 536 and is configured to move the arm 534 and HGA 510 to access portions of the magnetic-recording disk 520, as the carriage 536 is mounted on a pivot-shaft 548 with an interposed pivot-bearing assembly 552. HDD 501 also includes a load-unload ramp 590 for HGA 510 that is configured to engage a tongue 510e of HGA 510 at the far distal end of HGA 510 when arm 534 is retracted from a position for flying the magnetic-recording head 510a in proximity with the magnetic-recording disk 520.

With further reference to FIG. 5, in accordance with one or more embodiments of the present invention, electrical signals, for example, current to the voice coil 540 of the VCM, write signals to and read signals from the magnetic-recording head 510a, are provided by a flexible cable 556. Interconnection between the flexible cable 556 and the magnetic-recording head 510a may be provided by an arm-electronics (AE) module 560, which may have an on-board pre-amplifier for the read signal, as well as other read-channel and write-channel electronic components. The flexible cable 556 is coupled to an electrical-connector block 564, which provides electrical communication through electrical feedthroughs (not shown) provided by the disk-enclosure base 101-1. The disk-enclosure base 101-1, also referred to as a casting, depending upon whether the disk-enclosure base 101-1 is cast, in conjunction with a disk-enclosure cover 101-2 (not shown, here; but, see FIG. 1) provides a sealed, protective disk enclosure for the information storage components of HDD 501.

With further reference to FIG. 5, in accordance with one or more embodiments of the present invention, other electronic components (not shown), including a disk controller and servo electronics including a digital-signal processor (DSP), provide electrical signals to the drive motor, the voice coil 540 of the VCM and the magnetic-recording head 510*a* of HGA 510. The electrical signal provided to the drive motor enables the drive motor to spin providing a torque to the spindle 526 which is in turn transmitted to the magnetic-recording disk 520 that is affixed to the spindle 526 by the disk clamp 522; as a result, the magnetic-recording disk 520 spins in a direction 572. The spinning magnetic-recording disk 520 creates an airflow including an air-stream, and a cushion of air that acts as an air bearing on which the air-bearing surface (ABS) of the slider 510*b* rides so that the slider 510*b* flies in proximity with the surface of the magnetic-recording disk 520 with minimal contact between the slider 510*b* and the magnetic-recording disk 520 in which information is recorded. The electrical signal provided to the voice coil 540 of the VCM enables the magnetic-recording head 510*a* of HGA 510 to access a track 576 on which information is recorded. Thus, the armature 538 of the VCM swings through an arc 580 which enables HGA 510 attached to the armature 538 by the arm 534 to access various tracks on the magnetic-recording disk 520. Information is stored on the magnetic-recording disk 520 in a plurality of concentric tracks (not shown) arranged in sectors on the magnetic-recording disk 520, for example, sector 584. Correspondingly, each track is composed of a plurality of sectored track portions, for example, sectored track portion 588. Each sectored track portion 588 is composed of recorded data and a header containing a servo-burst-signal pattern, for example, an ABCD-servo-burst-signal pattern, information that identifies a track 576, and error correction code information. In accessing the track 576, the read element of the magnetic-recording head 510*a* of HGA 510 reads the servo-burst-signal pattern which provides a position-error-signal (PES) to the servo electronics, which controls the electrical signal provided to the voice coil 540 of the VCM, enabling the magnetic-recording head 510*a* to follow the track 576. Upon finding the track 576 and identifying a particular sectored track portion 588, the magnetic-recording head 510*a* either reads data from the track 576, or writes data to, the track 576 depending on instructions received by the disk controller from an external agent, for example, a microprocessor of a computer system.

With further reference to FIGS. 5 and 4, embodiments of the present invention encompass within their scope HDD 501 that includes a disk enclosure 101 configured to shield against EMI, a spindle motor (not shown) mounted in the disk-enclosure base 101-1. of the disk enclosure 101, a spindle 526 coupled to the spindle motor, at least one magnetic-recording disk 520 rotatably mounted on the spindle 526, and at least one magnetic-recording head 510*a* disposed to read data from, and to write data to, the magnetic-recording disk 520. The disk enclosure 101 is configured to shield an interior space enclosed by the disk enclosure 101 against EMI at a resonant frequency of a slot 101-4*a* of the disk enclosure 101. The vertical flange 101-2*b* of the disk-enclosure cover 101-2 may be ohmically coupled with low impedance to a laterally disposed blunt boss 210-1 of the plurality 210 of blunt bosses 210-1 and 210-2, as shown in FIG. 5. Alternatively, the vertical flange 101-2*c* of the disk-enclosure cover 101-2 may be ohmically coupled with low impedance to a laterally disposed blunt boss 220-1 of a plurality 220 of blunt bosses 220-1 and 220-2, as shown in FIG. 5. The vertical flange 101-2*b* of the disk-enclosure cover 101-2 may be capacitively coupled with low impedance to the laterally disposed blunt boss 210-1. Alternatively, the vertical flange 101-2*c* of the disk-enclosure cover 101-2 may be capacitively coupled with low impedance to the laterally disposed blunt boss 220-1. The laterally disposed blunt bosses 210-1 and 210-2, or alternatively, the laterally disposed blunt bosses 220-1 and 220-2, may be spaced to shield an interior space enclosed by the disk-enclosure base 101-1 and the disk-enclosure cover 101-2 against EMI with a frequency of about less than 3 GHz. The laterally disposed blunt bosses 210-1 and 210-2, or alternatively, the laterally disposed blunt bosses 220-1 and 220-2, may be spaced to shield an interior space enclosed by the disk-enclosure base 101-1 and the disk-enclosure cover 101-2 against EMI at a frequency of less than about 1.8 GHz by reducing an electric field component of an electromagnetic field associated with the EMI within the interior space to less than about 10 V/m. Thus, in accordance with embodiments of the present invention, the disk enclosure 101 is configured to reduce soft error rate (SER) during read operations by the magnetic-recording head 510*a* of data from the magnetic-recording disk 520.

With reference now to FIGS. 6A and 6B, in accordance with one or more embodiments of the present invention, flowcharts 600A and 600B of a method for assembling the HDD that includes a disk enclosure configured to shield against EMI are shown. The method includes the following operations. At 610, a disk-enclosure base of the HDD is positioned to receive a disk-enclosure cover. At 620, the disk-enclosure cover is placed on top of the disk-enclosure base such that vertical flanges of the disk-enclosure cover lie outside of sides and of the disk-enclosure base. At 630, a vertical flange of the disk-enclosure cover is pushed towards an adjacent side of the disk-enclosure base in a direction about perpendicular to the adjacent side in a manner that suppresses generation of particulate debris. The vertical flange of the disk-enclosure cover electrically couples with a laterally disposed blunt boss; and, the disk-enclosure cover and the disk-enclosure base are configured to shield an interior space enclosed by the disk enclosure against EMI. Alternatively, at 635, a second vertical flange of the disk-enclosure cover is pushed towards a second adjacent side of the disk-enclosure base in a direction about perpendicular to the second adjacent side in a manner that suppresses generation of particulate debris. The second vertical flange of the disk-enclosure cover electrically couples with a laterally disposed blunt boss; and, the disk-enclosure cover and the disk-enclosure base are configured to shield an interior space enclosed by the disk enclosure against EMI. After one or both of operations 630 and 635 are performed, at 640, the disk-enclosure cover is fastened to the disk-enclosure base.

Thus, embodiments of the present invention provide for EMI shielding of the disk enclosure 101 including the disk-enclosure cover 101-2 and the disk-enclosure base 101-1. In accordance with embodiments of the present invention, electrical coupling between the disk-enclosure cover 101-2 and the disk-enclosure base 101-1 is provided by blunt bosses located in areas other than where screws are located so that the use of additional screws and shorting tabs between the disk-enclosure cover 101-2 and the disk-enclosure base 101-1 can be avoided, thus, reducing cost of assembly. Moreover, embodiments of the present invention including a method of assembly of the HDD 501 provide for assembly of the HDD 501 without deformation of the disk-enclosure cover 101-2, or the shedding of deleterious particulate debris. In accordance with embodiments of the present invention, the method utilizes a machined blunt boss as an assembly datum instead of an external datum or screw based datum, in contrast with other assembly methods, thus, easing assembly. In addition, testing of embodiments of the present invention that utilize two blunt bosses at the front side of the disk enclosure 101 indicate that the external electromagnetic field intensity at the slot resonance frequency can be increased up to 20 to 70% without read failures, such as increased SER, thus, increasing reliability.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for manufacturing an electronic device enclosure configured to shield against electromagnetic interference, said electronic device enclosure comprising:
   providing an electronic device-enclosure base, comprising:
      a bottom; and
      sides and attached to said bottom in a boxlike configuration; and
   at least one laterally disposed blunt boss configured so as to be disposed between, and to couple electrically, a side of said electronic device-enclosure base and a vertical flange of an electronic device-enclosure cover;
   positioning said device-enclosure base to receive a device-enclosure cover;
   placing said device-enclosure cover on top of said device-enclosure base such that vertical flanges of said device-enclosure cover lie outside of sides and of said device-enclosure base;
   pushing on a vertical flange of said device-enclosure cover in a direction about perpendicular to a side of said device-enclosure base, in manner that suppresses generation of particulate debris, such that said vertical flange of said device-enclosure cover electrically couples with a laterally disposed blunt boss, and said device-enclosure cover and said device-enclosure base are configured to shield an interior space enclosed by said device enclosure base and cover against electromagnetic interference; and
   fastening said device-enclosure cover to said device-enclosure base;
   wherein said electronic device-enclosure base and said electronic device-enclosure cover are configurable with respect to said laterally disposed blunt boss to shield an interior space enclosed by said electronic device-enclosure base and said electronic device-enclosure cover against electromagnetic interference at a resonant frequency of a slot of said electronic device enclosure,
   wherein said electronic disk-enclosure cover is placed on top of said electronic disk-enclosure base such that vertical flanges of said electronic disk-enclosure cover lie outside of sides and of said electronic disk-enclosure base,
   wherein said vertical flange of said electronic disk-enclosure cover is pushed on in a direction about perpendicular to a side of said electronic disk-enclosure base, in manner that suppresses generation of particulate debris, such that said vertical flange of said electronic disk-enclosure cover electrically couples with a laterally disposed blunt boss.

2. The method of claim 1, wherein said at least one laterally disposed blunt boss is disposed in proximity to a top portion of said side of said electronic device-enclosure base and extends laterally outwards from said side.

3. The method of claim 1, wherein said electronic device enclosure base further comprises:
   an electronic device-enclosure cover, comprising:
      a top; and
      vertical flanges and of said electronic device-enclosure cover attached to said top in a boxlike configuration;
      wherein at least one vertical flange of said electronic device-enclosure cover is configured to couple electrically with said laterally disposed blunt boss of said electronic device enclosure.

4. The method of claim 3, wherein said at least one laterally disposed blunt boss is disposed on said vertical flange and extends laterally inwards from an inside of said vertical flange.

5. The method of claim 3, wherein said vertical flange of said electronic device-enclosure cover is ohmically coupled with low impedance to said laterally disposed blunt boss.

6. The method of claim 3, wherein said vertical flange of said electronic device-enclosure cover is capacitively coupled with low impedance to said laterally disposed blunt boss.

7. The method of claim 3, wherein said electronic device-enclosure cover is coupled electrically with said electronic device-enclosure base in a direction about normal to a plane different than a plane of said top of said electronic device-enclosure cover.

8. The method of claim 3, wherein said vertical flange of said electronic device-enclosure cover is disposed about orthogonally to said top of said electronic device-enclosure cover.

9. The method of claim 1, wherein said laterally disposed blunt boss, said vertical flange and said electronic device-enclosure cover are configured to suppress generation of particulate debris, upon assembling said electronic device-enclosure cover with said electronic device-enclosure base.

10. The method of claim 1, wherein said laterally disposed blunt boss, said vertical flange and said electronic device-enclosure cover are configured to suppress production of strain in said electronic device-enclosure cover, upon assembling said electronic device-enclosure cover with said electronic device-enclosure base.

11. The method of claim 1, wherein said laterally disposed blunt boss has a shape of a semi-cylindrical body.

12. The method of claim 1, wherein said electronic device-enclosure base further comprises:
   a second side, comprising:
      at least one laterally disposed blunt boss disposed in proximity to a top portion of said second side of said electronic device-enclosure base, and configured to couple electrically with said electronic device-enclosure cover.

13. The method of claim 12, wherein said side and said second side are adjacent sides of said electronic device-enclosure base.

14. The method of claim 12, wherein said side and said second side are about orthogonally disposed to one another.

15. The method of claim 12, wherein laterally disposed blunt bosses are spaced to shield an interior space enclosed by said electronic device-enclosure base and said electronic device-enclosure cover against electromagnetic interference with a frequency of about less than 3 gigahertz (GHz).

16. The method of claim 12, wherein laterally disposed blunt bosses are spaced to shield an interior space enclosed by said electronic device-enclosure base and said electronic device-enclosure cover against electromagnetic interference at a frequency of less than about 1.8 GHz by reducing an electric field component of an electromagnetic field associated with said electromagnetic interference within said interior space to less than about 10 volts/meter (V/m).

17. A method for manufacturing a hard-disk drive, comprising:
providing a disk enclosure configured to shield against electromagnetic interference, said disk enclosure comprising:
a disk-enclosure base, comprising:
a bottom; and
sides and of said disk-enclosure base attached to said bottom in a boxlike configuration, at least one side, comprising:
at least one laterally disposed blunt boss disposed in proximity to a top portion of said side and extending laterally outwards from said side; and
providing a disk-enclosure cover, comprising:
a top; and
vertical flanges and of said disk-enclosure cover attached to said top in a boxlike configuration;
positioning said disk-enclosure base to receive a disk-enclosure cover;
placing said disk-enclosure cover on top of said disk-enclosure base such that vertical flanges of said disk-enclosure cover lie outside of sides and of said disk-enclosure base;
pushing on a vertical flange of said disk-enclosure cover in a direction about perpendicular to a side of said disk-enclosure base, in manner that suppresses generation of particulate debris, such that said vertical flange of said disk-enclosure cover electrically couples with a laterally disposed blunt boss, and said disk-enclosure cover and said disk-enclosure base are configured to shield an interior space enclosed by said disk enclosure base and cover against electromagnetic interference; and
fastening said disk-enclosure cover to said disk-enclosure base;
wherein said side of said disk-enclosure base including said laterally disposed blunt boss is electrically coupled with a vertical flange of said disk-enclosure cover by said laterally disposed blunt boss,
wherein said disk-enclosure cover is placed on top of said disk-enclosure base such that vertical flanges of said disk-enclosure cover lie outside of sides and of said disk-enclosure base,
wherein said vertical flange of said disk-enclosure cover is pushed on in a direction about perpendicular to a side of said disk-enclosure base, in manner that suppresses generation of particulate debris, such that said vertical flange of said disk-enclosure cover electrically couples with a laterally disposed blunt boss;
a spindle motor mounted in said disk-enclosure base;
a spindle coupled to said spindle motor;
at least one magnetic-recording disk rotatably mounted on said spindle; and
at least one magnetic-recording head disposed to read data from, and to write data to, said magnetic-recording disk;
wherein said disk enclosure is configured to shield an interior space enclosed by said disk enclosure against electromagnetic interference at a resonant frequency of a slot of said disk enclosure.

18. The method of manufacturing said hard-disk drive of claim 17, wherein said disk enclosure is configured to reduce soft error rate during read operations by said magnetic-recording head of data from said magnetic-recording disk.

19. The method of manufacturing said hard-disk drive of claim 17, wherein said vertical flange of said disk-enclosure cover is ohmically coupled with low impedance to said laterally disposed blunt boss.

20. The method of manufacturing said hard-disk drive of claim 17, wherein said vertical flange of said disk-enclosure cover is capacitively coupled with low impedance to said laterally disposed blunt boss.

21. The method of manufacturing said hard-disk drive of claim 17, wherein laterally disposed blunt bosses and are spaced to shield an interior space enclosed by said disk-enclosure base and said disk-enclosure cover against electromagnetic interference with a frequency of about less than 3 GHz.

22. The method of manufacturing said hard-disk drive of claim 17, wherein laterally disposed blunt bosses and are spaced to shield an interior space enclosed by said disk-enclosure base and said disk-enclosure cover against electromagnetic interference at a frequency of less than about 1.8 GHz by reducing an electric field component of an electromagnetic field associated with said electromagnetic interference within said interior space to less than about 10 V/m.

23. The method of manufacturing said hard-disk drive of claim 17, wherein said disk-enclosure base further comprises:
a second side, comprising:
at least one laterally disposed blunt boss disposed in proximity to a top portion of said second side of said disk-enclosure base and extending laterally outwards from said side, and configured to couple electrically with said vertical flange of said disk-enclosure cover.

24. A method for assembling a hard-disk drive including a disk enclosure configured to shield against electromagnetic interference, said method comprising:
positioning a disk-enclosure base of said hard-disk drive to receive a disk-enclosure cover;
placing said disk-enclosure cover on top of said disk-enclosure base such that vertical flanges of said disk-enclosure cover lie outside of sides and of said disk-enclosure base;
pushing on a vertical flange of said disk-enclosure cover in a direction about perpendicular to a side of said disk-enclosure base, in manner that suppresses generation of particulate debris, such that said vertical flange of said disk-enclosure cover electrically couples with a laterally disposed blunt boss, and said disk-enclosure cover and said disk-enclosure base are configured to shield an interior space enclosed by said disk enclosure against electromagnetic interference; and
fastening said disk-enclosure cover to said disk-enclosure base.

25. The method for assembling a hard-disk drive of claim 24, further comprising:
pushing on a second vertical flange of said disk-enclosure cover in a direction about perpendicular to a second side of said disk-enclosure base, in manner that suppresses generation of particulate debris, such that said second vertical flange electrically couples with another laterally disposed blunt boss of said second side, and said disk-enclosure cover and said disk-enclosure base are configured to shield an interior space enclosed by said disk enclosure against electromagnetic interference, without generation of particulate debris.

* * * * *